2,765,077

FROTH FLOTATION OF ASTRAKANITE

Lockwood W. Ferris, Salt Lake City, Utah, assignor to Compania Salitrera Anglo-Lautaro (Anglo-Lautaro Nitrate Corporation), New York, N. Y.

No Drawing. Application November 15, 1952, Serial No. 320,834

3 Claims. (Cl. 209—166)

This invention relates to the preparation and recovery of water-soluble minerals or inorganic compounds by froth flotation. More particularly, the invention contemplates the provision of an improved process or method for treating a product containing or consisting essentially of solid sodium chloride and astrakanite $$(MgSO_4 \cdot Na_2SO_4 \cdot 4H_2O)$$

to produce or obtain (1) a concentrate containing the astrakanite in predominant proportion or consisting essentially of astrakanite and (2) a concentrate containing the sodium chloride in predominant proportion or consisting essentially of sodium chloride.

The method or process of the invention may be employed advantageously in the treatment of sodium chloride-astrakanite mixtures from any source. The method or process of the invention may be employed with particular advantage in conjunction with processes involving the recovery by solution and evaporation of sodium nitrate from natural sodium nitrate-bearing deposits which contain sodium chloride and astrakanite associated with the sodium nitrate. The presence of astrakanite in the aqueous liquid used for leaching the sodium nitrate-bearing material to produce an aqueous solution of sodium nitrate, but at certain stages of the process, astrakanite is precipitated through the effects of relatively large concentrations of sodium chloride that have built up in the solution, and a precipitate or product comprising or consisting essentially of solid particles or crystals of astrakanite and solid particles or crystals of sodium chloride in admixture is produced with the result that the astrakanite in the solution is reduced to a point below its most effective concentration.

The method or process of the present invention may be employed advantageously to effect a separation of the precipitated astrakanite from the precipitated sodium chloride and, thus, to provide a concentrate product of relatively pure or substantially pure astrakanite which may be utilized for re-establishing desired concentrations of astrakanite in sodium nitrate solutions. At the same time, a sodium chloride concentrate will be produced. If desired, the initial concentrates may be re-treated in accordance with the process of the invention to effect further separation of the astrakanite and sodium chloride and produce substantially pure astrakanite and substantially pure sodium chloride. Normally, however, the initial astrakanite concentrate will be sufficiently high in astrakanite content to permit its use, without further treatment, for adjusting the composition of the sodium nitrate solution.

In accordance with a method or process of the invention, a solid product containing astrakanite and sodium chloride in large proportion or consisting essentially of astrakanite and sodium chloride is subjected in the form of an aqueous pulp saturated with respect to the components of the product and containing solid, finely divided particles of the product suspended therein to a froth flotation operation in the presence of one or more alkali metal salts (preferably sodium salts) of one or more acids of the naphthenic acid group to produce an astrakanite concentrate in the form of a froth. A small amount of a suitable frothing agent may be employed.

The naphthenic acid reagent employed may be a compound of a single naphthenic acid, a mixture of compounds of all or a portion of acids associated with or derived from the naphthenic cycloalkanes of mineral oils and asphalt oils.

For creating or assisting in creating froth, I may employ any suitable frothing agent, but prefer to employ an aliphatic alcohol having frothing properties. Such alcohols include the isomers of hexyl alcohol containing an isometric methyl group. Such isomers may be designated, methyl amyl alcohols or methyl pentanols. The alcohol designated or described as 3-methyl-1-pentanol, or a mixture of methyl amyl alcohols containing a substantial proportion of that compound may be employed advantageously.

The product to be subjected to froth flotation treatment may be ground to produce particles of any suitable sizes. Thus, for example, satisfactory results may be obtained by grinding to produce a finely divided product consisting of particles small enough to pass a 48-mesh screen. Grinding to produce a finely divided product consisting essentially of particles small enough to pass a 100-mesh screen, however, results in economy in reagent costs and in a cleaner separation by froth flotation of the components of the original product.

The froth flotation method of the invention may be carried out with a pulp maintained at any suitable temperature. A temperature in the range of about 70° F. to 100° F. (or higher or lower if the atmospheric temperature at the point of location of the operation is higher or lower) may be employed advantageously.

A product of the following composition, typical of the precipitates of astrakanite produced in the sodium nitrate process, was treated to demonstrate the effectiveness of the method or process of the present invention:

| Component | Percent by Weight |
|---|---|
| Sodium Chloride (NaCl) | 35.6 |
| Astrakanite (MgSO$_4$.Na$_2$SO$_4$.4H$_2$O) | 63.4 |
| Moisture and impurities | 2.0 |

In carrying out a typical test employing the method of the invention in treating a product of the above-indicated composition, two hundred and fifty (250) grams of the solid product were ground to form a finely divided product consisting of solid particles small enough to pass a 100-mesh screen, and the resulting particles were suspended in an aqueous solution saturated with respect to the water-soluble components of the product undergoing treatment to form an aqueous flotation pulp containing about ten percent (10%) of suspended solids. The pulp was subjected to a froth flotation treatment in a laboratory flotation cell at room temperature in the presence of the sodium salt of naphthenic in amount equivalent to two (2.0) pounds per ton of the suspended solid particles and methyl amyl alcohol (3-methyl-1-pentanol) in amount equivalent to three-tenths (0.3) of a pound per ton of the suspended solid particles.

Agitation of the pulp with the added flotation reagents resulted in the production of astrakanite-bearing froth concentrate substantially immediately. The froth produced was skimmed from the surface of the pulp in the flotation cell during a period of about three minutes. The residual pulp was removed from the flotation cell and filtered to separate the liquid and solid phases. The filter cake contained a large proportion of the sodium chloride of the original product subjected to treatment and constituted a concentrate with respect to sodium chloride (or a tailing product with respect to astrakanite).

The following tables show the composition of the two concentrates and the distribution of the components of the original product:

Table I

|  | Percent by Weight | Sodium Chloride, Percent by Weight | Astrakanite, Percent by Weight |
|---|---|---|---|
| Astrakanite concentrate | 60.5 | 2.85 | 97.8 |
| Sodium Chloride concentrate | 39.5 | 76.00 | 25.4 |

Table II

|  | Distribution (Percent by Weight) | |
|---|---|---|
|  | Sodium Chloride | Astrakanite |
| Astrakanite concentrate | 5.5 | 85.4 |
| Sodium Chloride concentrate | 94.5 | 14.6 |

I claim:

1. The method of separating astrakanite from sodium chloride contained in a solid product consisting essentially of astrakanite and sodium chloride which comprises subjecting the product in the form of an aqueous pulp saturated with respect to the components of the product and containing solid, finely divided particles of the product suspended therein to a froth flotation operation in the presence of one or more alkali metal salts of one or more acids of the naphthenic acid group to produce an astrakanite concentrate in the form of a froth and a sodium chloride concentrate dispersed in the flotation pulp, and separating the froth from the flotation pulp.

2. The method of separating astrakanite from sodium chloride contained in a solid product comprising a mixture of astrakanite and sodium chloride which comprises subjecting the product in the form of an aqueous pulp saturated with respect to the components of the product and containing solid, finely divided particles of the product suspended therein to a froth flotation operation in the presence of a sodium salt of an acid of the naphthenic acid group and 3-methyl-1-pentanol to produce an astrakanite concentrate in the form of a froth and a sodium chloride concentrate dispersed in the flotation pulp, and separating the froth from the flotation pulp.

3. The method of separating astrakanite from sodium chloride as defined in claim 1 wherein the one or more alkali metal salts of one or more acids of the naphthenic acid group is a sodium salt of a naphthenic acid.

References Cited in the file of this patent

UNITED STATES PATENTS 2,222,332    Weinig _____ Nov. 19, 1940

OTHER REFERENCES

U. S. Bureau of Mines Report of Investigations 3397, May 1938, pages 14–18.

Taggart: Handbook of Mineral Dressings, pages 12–02; 12–40; 12–42; 12–43; 12–45; 12–124; 12–125.